United States Patent [19]
Osborn

[11] Patent Number: 5,456,638
[45] Date of Patent: Oct. 10, 1995

[54] COMPOSITE GEAR WITH RESTRAINING MEMBER

[76] Inventor: Merritt A. Osborn, 178 Crystal La., Aurora, Ohio 44202

[21] Appl. No.: 278,409

[22] Filed: Jul. 21, 1994

[51] Int. Cl.⁶ ................................................ F16H 55/00
[52] U.S. Cl. ........................................... 474/155; 474/164
[58] Field of Search ........................... 474/152, 155–158, 474/160, 164; 74/640, 445

[56] References Cited

U.S. PATENT DOCUMENTS

| | | | |
|---|---|---|---|
| 1,877,339 | 9/1932 | Kottlowski | 474/164 X |
| 1,970,763 | 9/1934 | Miller et al. | 474/164 |
| 2,938,690 | 5/1960 | Castle . | |
| 3,108,488 | 10/1963 | Huszar . | |
| 3,151,495 | 10/1964 | Kurtz . | |
| 3,975,969 | 8/1976 | Osborn et al. . | |
| 4,307,630 | 12/1981 | Osborn et al. . | |
| 4,640,154 | 2/1987 | Osborn . | |
| 5,080,638 | 1/1992 | Osborn . | |
| 5,303,477 | 4/1994 | Kuzarov | 474/164 X |

*Primary Examiner*—Michael Powell Buiz
*Attorney, Agent, or Firm*—Calfee, Halter & Griswold

[57] ABSTRACT

A composite gear member and gear set using the composite gear member is provided. The composite gear member is formed of a generally circular disk having a pair of link plate supporting surfaces separated by a central section. A roller chain which includes a plurality of rollers rotatably mounted on support pins extends between link plates. The chain is reeved around the disk with the link plates being supported in the grooves on the link plate supporting surfaces. Retaining devices in the form of retaining plates or pins are connected between the chain and the disk to restrain circumferential movement of the chain with respect to the disk. This also prevents circumferential slipping of the chain.

If the mounting of the chain on the disk is by a retaining plate device engaging the link plate, a single strand of chain is utilized to form the entire gear member, with the second toothed gear being arranged to drivingly engage the rollers. If pins are utilized extending between certain of the rollers, a double or other multiple-strand chain is utilized with one strand engaging the disk and the other strand or strands being available to engage a toothed gear. With this arrangement, the toothed gear can engage the second strand, either internally or externally.

11 Claims, 5 Drawing Sheets

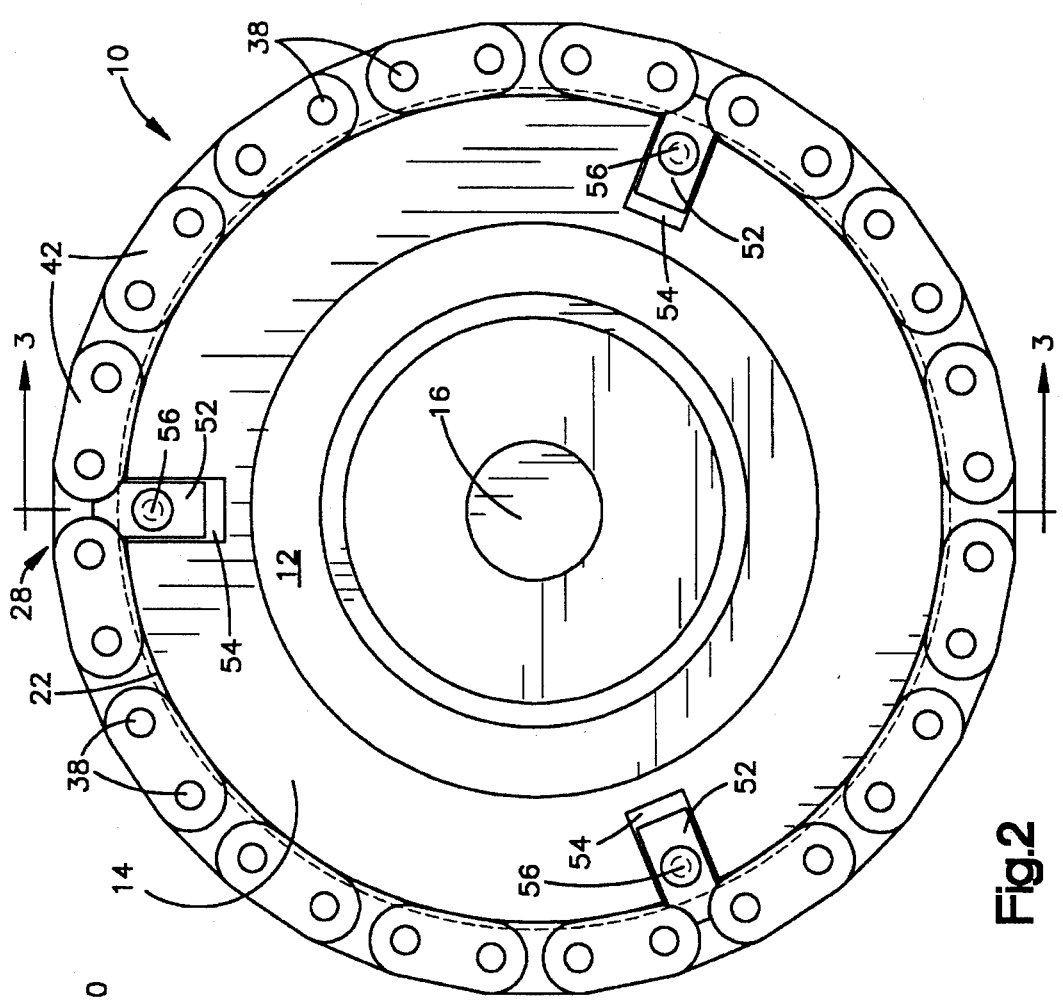
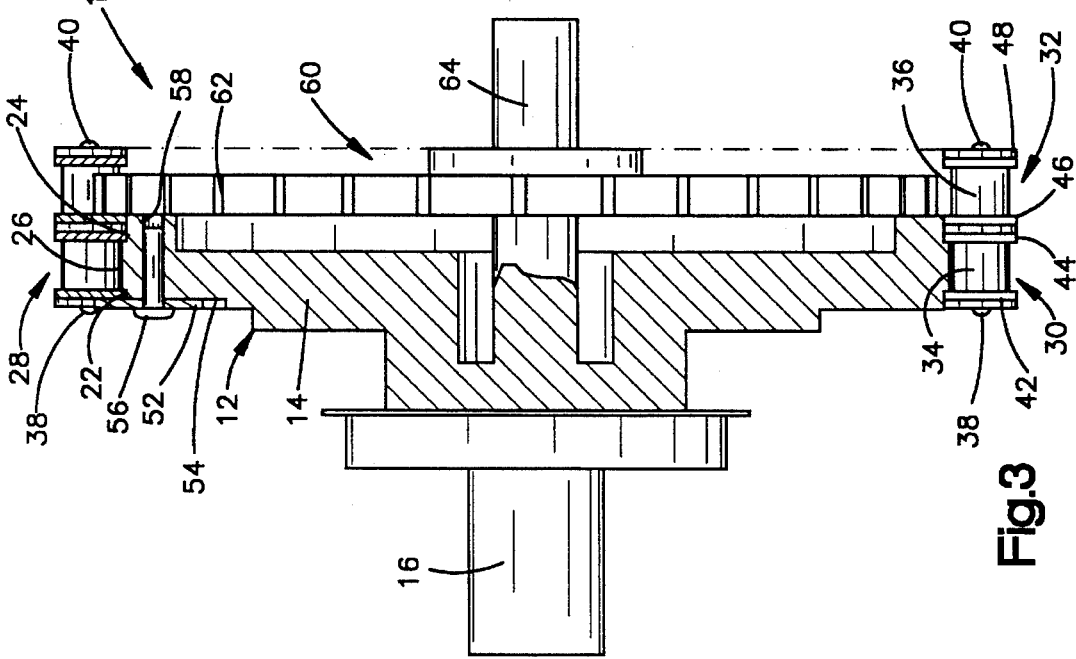

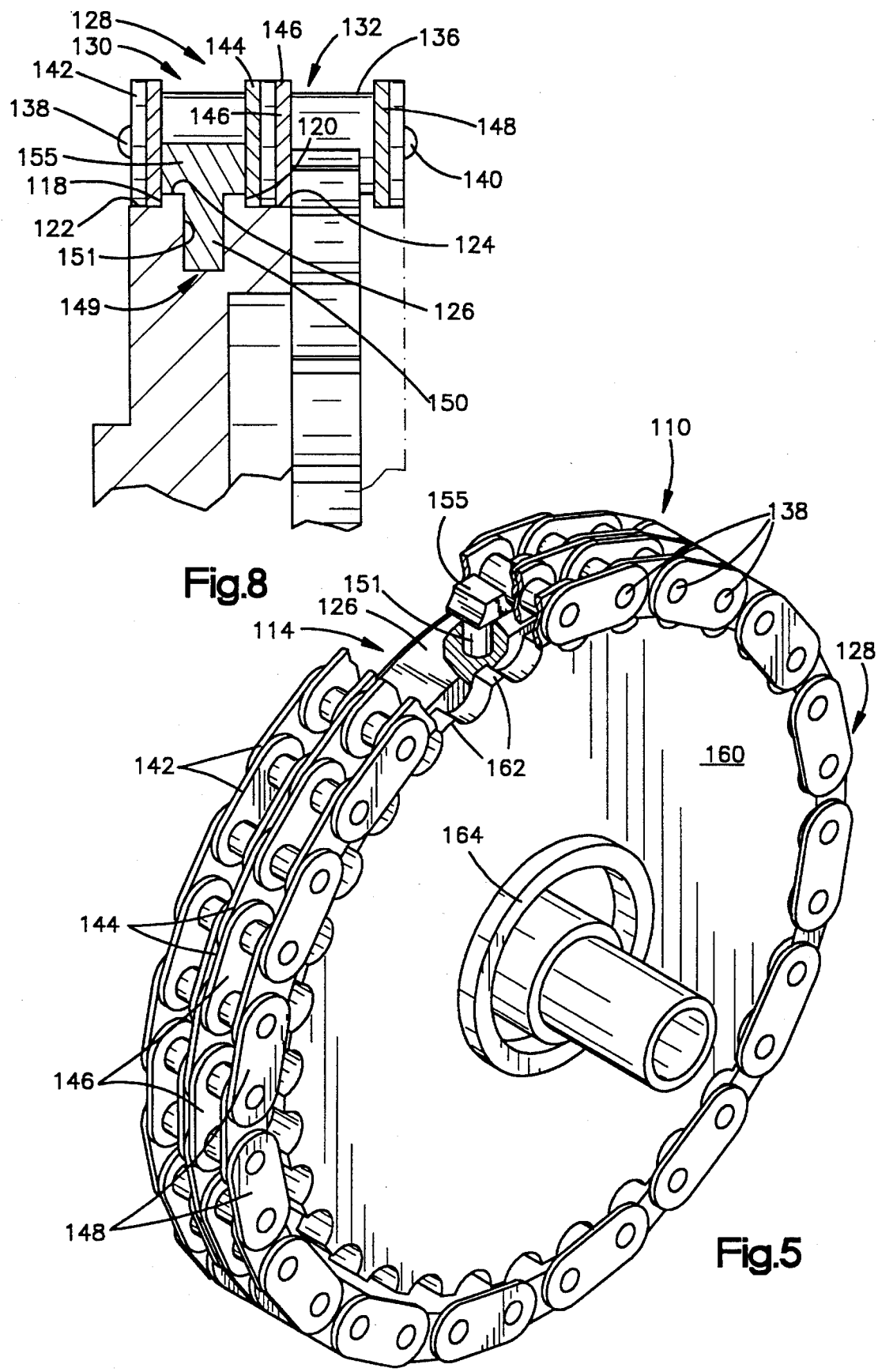

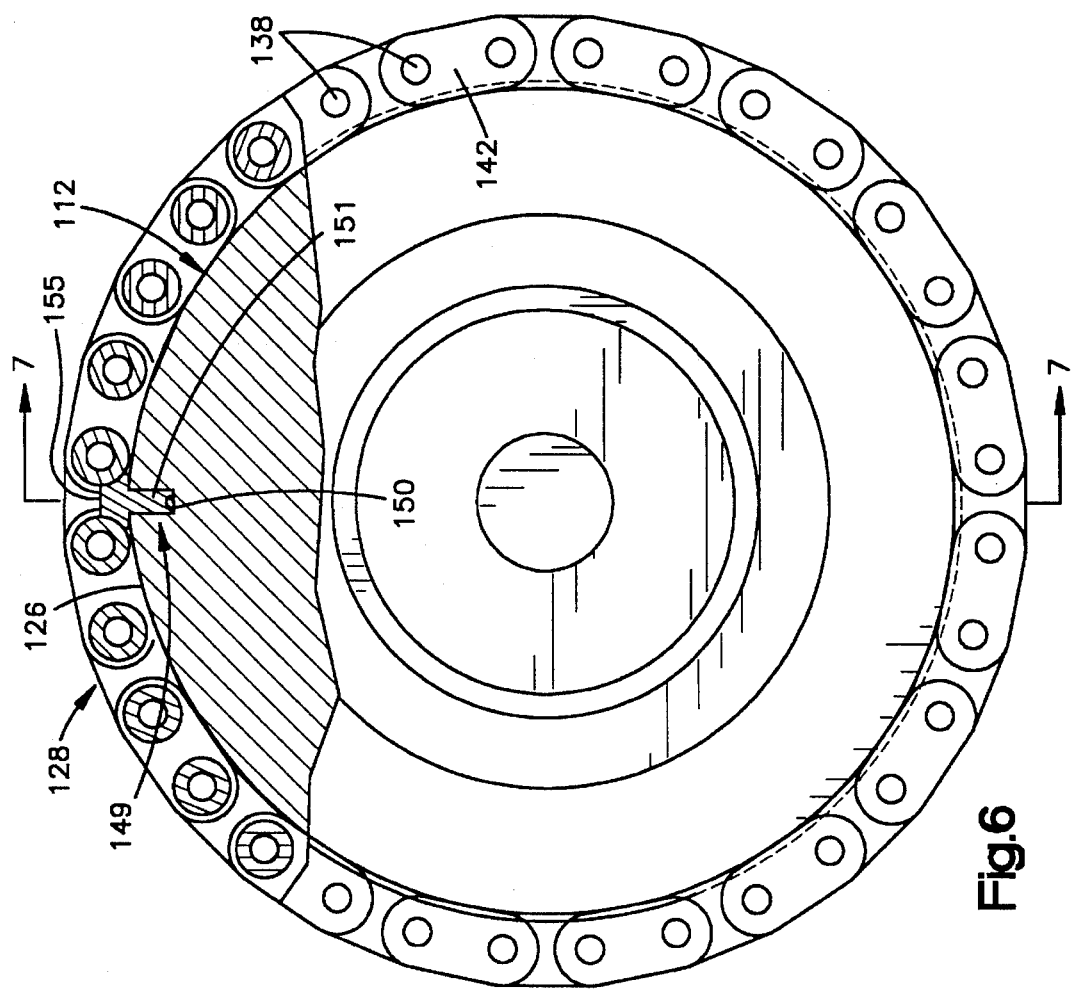
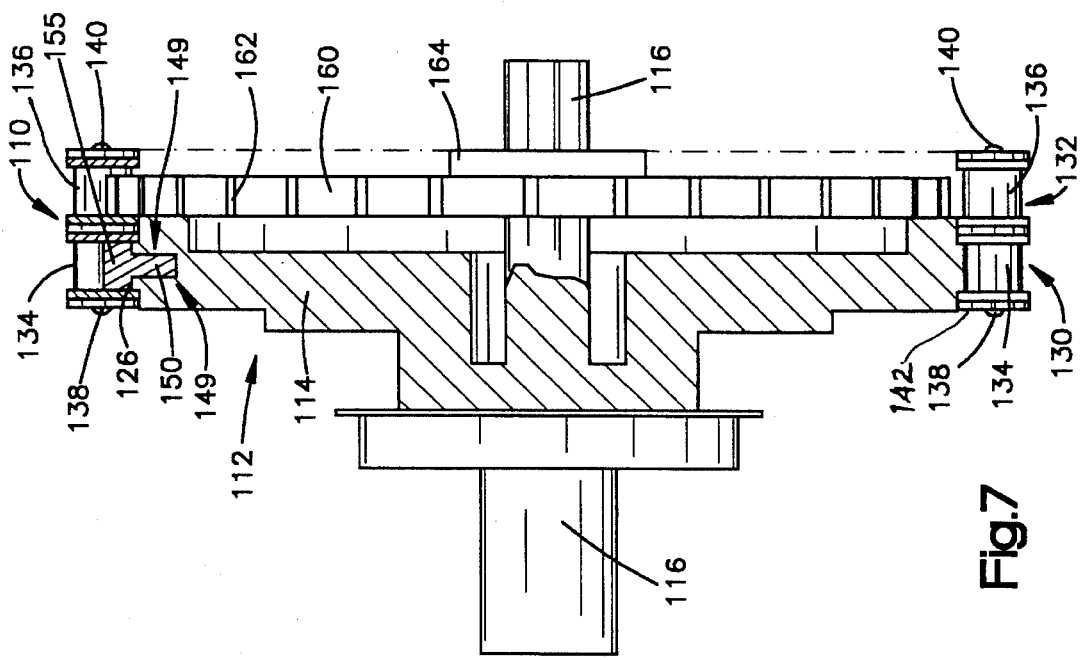

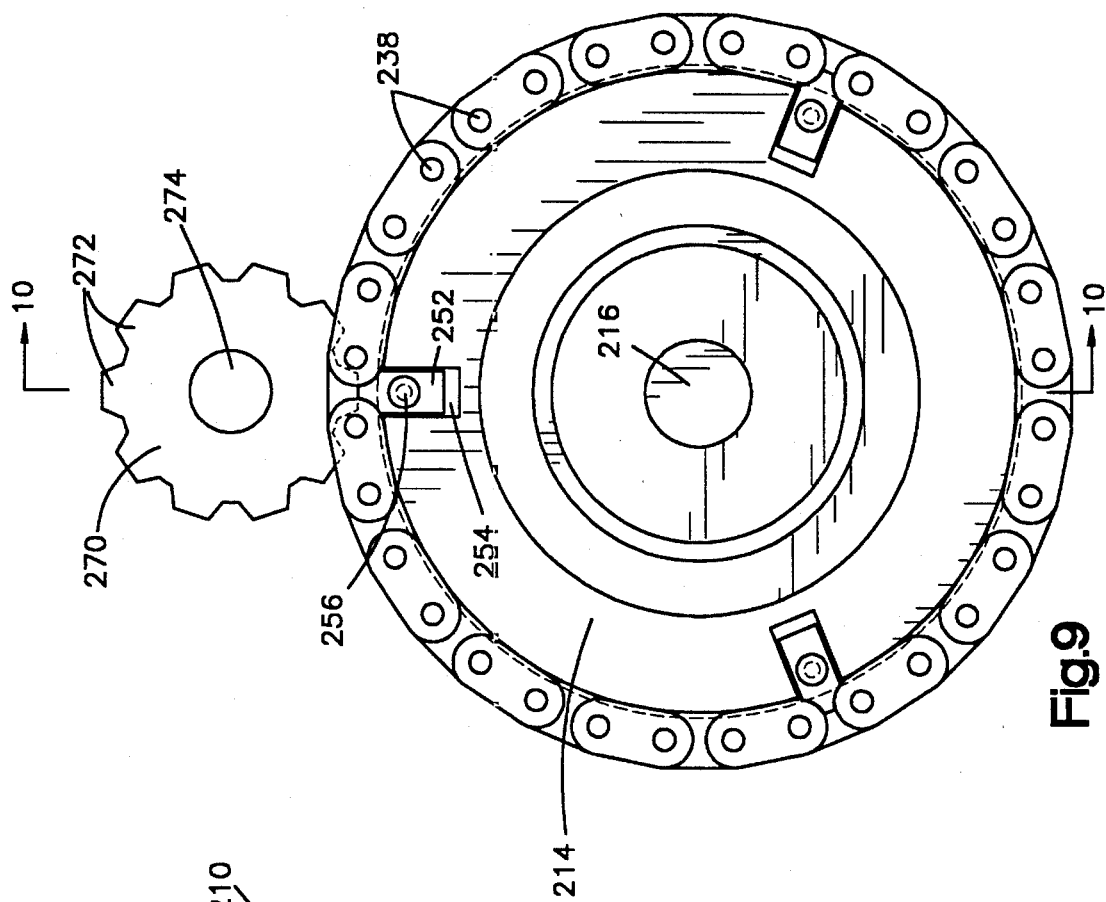
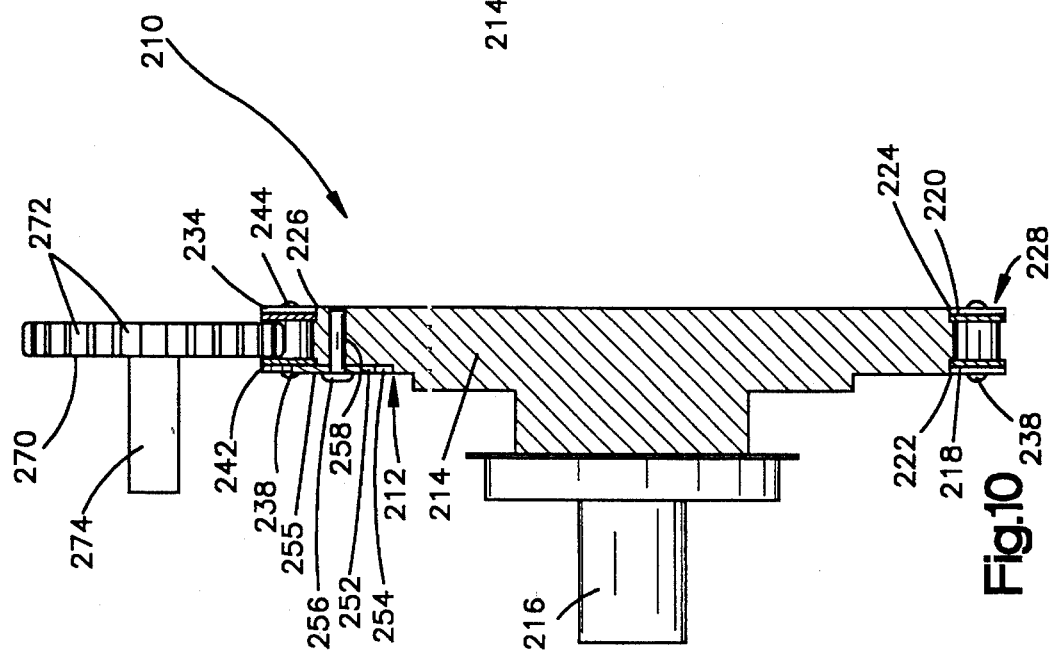

COMPOSITE GEAR WITH RESTRAINING MEMBER

BACKGROUND OF THE INVENTION

This invention relates generally to gear devices, and more particularly to gear devices employing a composite gear including a chain reeved around a disk which supports the chain to act as an engagement for one or more toothed gears.

BACKGROUND ART

There have been several prior proposals employing chains reeved around disks or other support members to provide a composite gear member which will engage a second or toothed gear member to provide epicylic, planetary or other well-known type of gear action. Various composite gears utilizing different chain configurations are shown in various patents. For example, U.S. Pat. Nos. 3,151,495 issued to Kurtz and 3,975,969 issued to Osborn (the inventor herein) show various configurations where twin stranded chain is used to form a composite gear. In both of these patents, a toothed support member is provided to engage the rollers of one strand of the chain and mount the chain thereon to form the composite gear member. The second strand engages a second or toothed gear member to thus form the chain interconnection with the toothed gear.

While this configuration works well in many instances, it does have certain limitations. First, thesupport of the chain is essentially completely on the rollers of one strand of the chain. This has several drawbacks. First, there is a strong propensity of the chain to cant or tilt when subject to pressure, thus causing the unsupported strand of the chain to be skewed and have less than optimal engagement with the tooth gear member which it is engaging. The greater the pressure on the cantilevered strand, the more detrimental this effect is. Indeed, this is especially detrimental when there is a third strand or chain which engages a third toothed gear.

Another drawback of this configuration is that the rollers which are engaging the teeth on the support member are not available to mesh with teeth on the second gear, thus requiring a cantilevered structure of at least two strands of chain, one of the strands being engaged on the teeth of the support member, with other, cantilevered, strands acting as the meshing device for the tooth gear engagement. Expressed another way, it is not possible to use a single-strand link chain for gearing in this configuration, but rather a chain of at least two strands is required.

Another problem encountered is the necessity to precisely form the teeth on the supporting member so that they align with the openings between the rollers on the chain and provide the proper and desired tension in the chain when the gear is being assembled. This is a relatively precise forming operation, and thus is relatively costly.

Hence, while this type of reeved chain configuration has found certain applications in the prior art, there are certain drawbacks and certain situations which tend to result in less than optimal performance of this type of supported chain gear configuration.

Another configuration is shown in Huszar U.S. Pat. No. 3,108,488. In this patent, a composite gear is shown wherein a single strand of chain is reeved around a disk. In one embodiment, the link plates are supported on shoulders while the rollers clear the center or periphery. In another embodiment, the rollers are replaced with non-rotating stud shafts and both the stud shafts and link plate abut the periphery of the supporting member. In both of these embodiments, a clamp is used which squeezes the chain against the periphery of the disk. These configurations rely solely on friction to hold the chain on a smooth surface. A second or toothed gear engages the single strand of chain for gear action. This arrangement, while permitting external gearing, has several deficiencies. First, it relies solely on friction to engage the chain with the support member, and under even moderately heavy loads there tends to be significant slippage, which for many applications is unacceptable. Additionally, this configuration does not allow for internal gearing, such as that provided for by the Osborn and Kurtz devices.

Moreover, in this configuration of Huszar, it is extremely difficult to obtain the proper tension on the chain. Too little tension will not result in any significant gripping, and too much will stress the chain beyond its elastic limit, thus causing reduced gripping and out of tolerance parts.

Thus, none of the composite gear structures provided an entirely satisfactory solution to certain problems in forming a composite chain gear member.

SUMMARY OF THE INVENTION

According to the present invention, an improved composite gear member and gear set using the composite gear member is provided. The composite gear member is formed of a generally circular disk having a pair of circumferentially-extending spaced link plate receiving grooves, with each link plate receiving groove having a link plate supporting surface separated by a central section. A roller chain is provided which includes a plurality of rollers rotatably mounted on support pins extending between first and second side or link plates. The chain is reeved around the disk with the first and second link plates being supported in the first and second grooves on the link plate supporting surfaces. At least one retaining device is connected between the chain and the disk to restrain circumferential movement of the chain with respect to the disk. In one embodiment, the retaining device is a pin that extends generally into the central section and between a pair of rollers which engages the rollers and prevents the chain from slipping circumferentially on the disk. In another embodiment, the retaining device is in the form of a key or similar retaining plate device which extends from a flange on the disk between a pair of link plates. This also prevents circumferential slipping, while not interfering with the action of the roller.

If the mounting of the chain on the disk is by a retaining plate device engaging the link plate, a single strand of chain can be utilized to form the entire gear member, with the second toothed gear being arranged to drivingly engage the rollers. If pins are utilized extending between certain of the rollers, the space between the rollers is not available for driving an external connection of a toothed gear, and hence a double or other multiple-strand chain must be utilized with one strand engaging the disk and the other strand or strands being available to engage a toothed gear. With this arrangement, the toothed or second gear can engage the second strand, either internally or externally, whereas with the embodiment where single strand chain is used, only an external engagement of a gear can be accomplished.

BRIEF DESCRIPTION OF THE DRAWINGS

FIG. 2 is a side elevational view of the gear set of FIG. 1;

FIG. 3 is a sectional view taken substantially along the plane designated by a line 3—3 of FIG. 1;

FIG. 5 is another embodiment of a gear set utilizing a composite gear according to this invention;

FIG. 6 is a side elevational view partially in section of the gear set of FIG. 5;

FIG. 7 is a sectional view taken substantially along the plane designated as line 7—7 of FIG. 6;

FIG. 8 is a detailed view of a portion of the gear set as shown in FIG. 7;

FIG. 9 is a front elevational view of an embodiment of the present invention providing for external gear meshing; and FIG. 10 is a side elevational of the device of FIG. 9.

DESCRIPTION OF THE PREFERRED EMBODIMENTS

Figure 4:
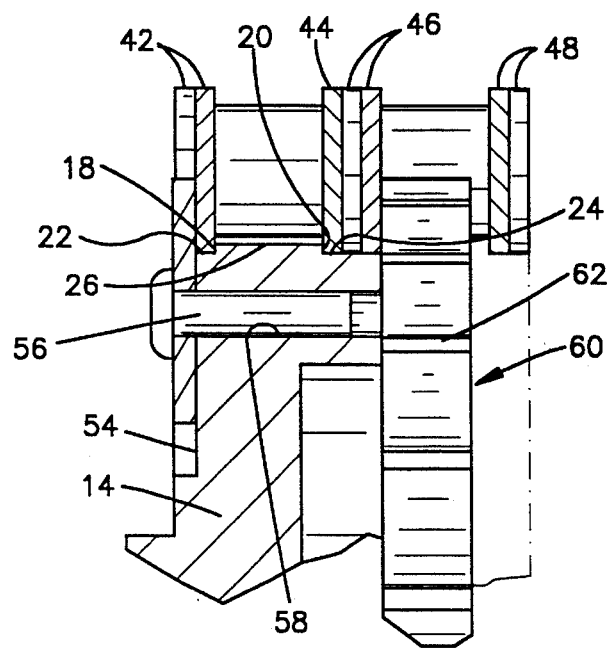
FIG. 4 is a detail view of a portion of the gear set shown in FIG. 3.
Figure 1:
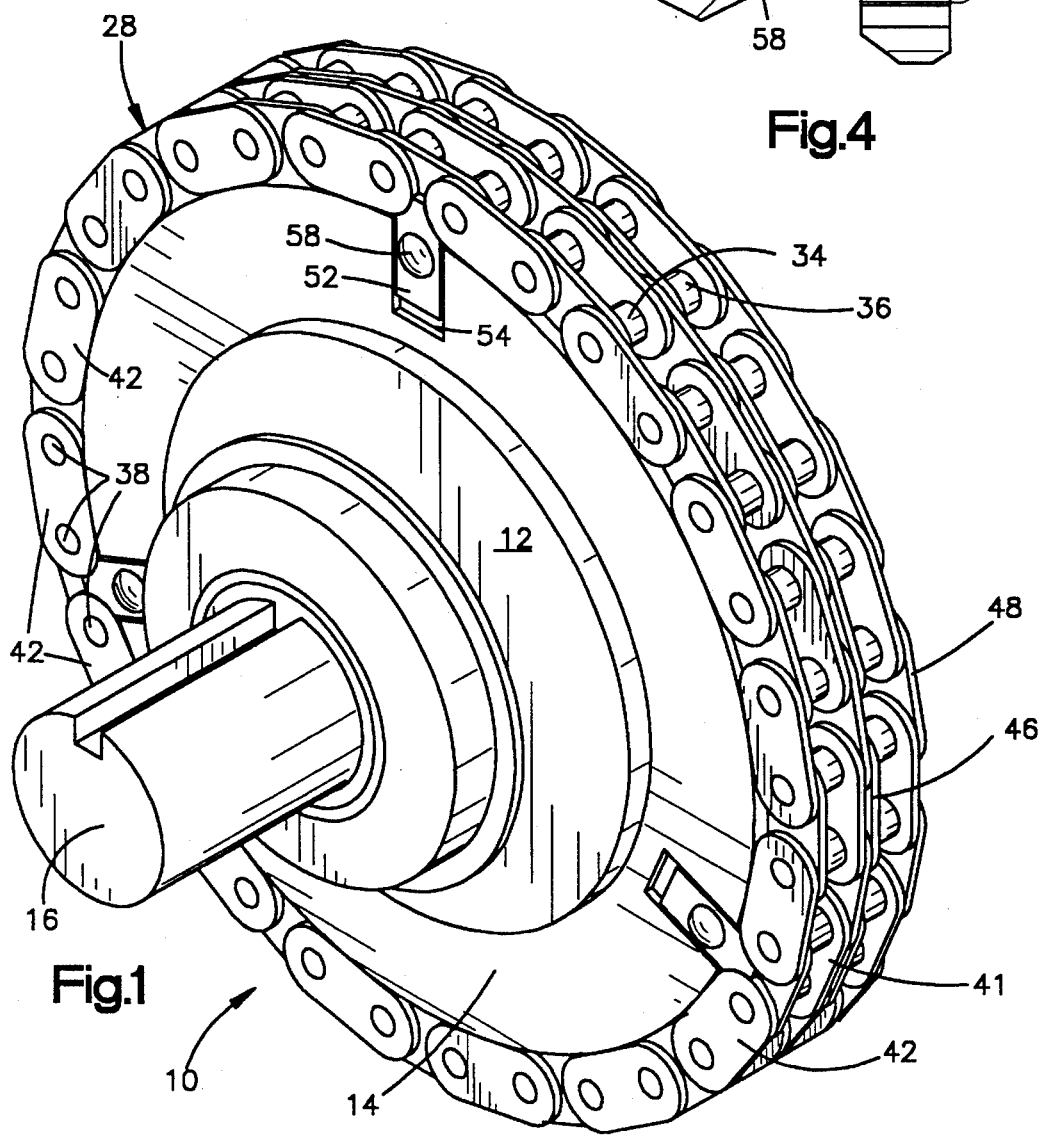
FIG. 1 is a perspective view of a gear set utilizing a composite gear according to the present invention.

Referring now to the drawings, and for the present to FIG. 1–4, one embodiment of the present invention is shown. In this embodiment, a gear set 10 is provided which incorporates a composite gear 12. The composite gear 12 includes a circular disk-shaped member 14 which has a drive shaft 16 extending therefrom. Around the outer periphery of the disk member 14 are a pair of slots 18, 20, each of which have lower surfaces 22, 24 which are link plate supporting surfaces to support the link plates of the chain portion of the composite gear as will be described presently. The slots 18, 20 are separated by a central portion 26.

A roller chain 28 having a pair of strands 30, 32 is reeved around the disk 14. The strands 30, 32 have rollers 34, 36, respectively, which are rotatably mounted on pins 38 and 40, respectively, the pins 38 extending between link plates 42 and 44 of strand 30, and the pins 40 extending between link plates 46 and 48 of strand 32. The link chain 28 as thus described is a conventional dual-strand roller link chain which is commercially available. The chain 38 is reeved around the disk 14 such that the link plates 42 bear against the link plate support surface 22, and the link plates 44, 46 bear against link plate support surface 24. Moreover, the central portion 26 of the disk 14 and the slots 18, 20 are so configured and sized that the rollers 34 are spaced from the top of the central portion 26 so that the rollers 34 are freely rotatable on their pins 38. Typically, a space of 0.010 inch is satisfactory.

In order to retain or prevent the chain 28 from slipping circumferentially, three circumferentially spaced retainer plates 52 are provided which are disposed in milled slots 54 which extend radially from the link plate supporting surface 22 toward the center of the disk 14. (Of course, more or fewer retainer plates can be used.) The retainer plates 52 are each provided with tapered ends 55 which engage portions of the link plates 42 to restrain the chain 28 from slipping circumferentially. The retainer plates 52 are held in place by set screws 56 which threadably engage threaded bores 58, drilled and tapped into the disk 14. With this configuration, the chain 28 is firmly supported, with the link plates 42, 44, 46 engaging the link plate support surfaces 22, 24, and with the rollers 34 freely rotatable and the chain 28 restrained from circumferential slippage or movement on the disk 14 by means of the retainer plates 52. It should be noted that the screws do not carry any appreciable load, the load being carried by the retainer plate 52 bearing against the slots 54.

A conventional toothed gear 60 is provided, having teeth 62 which internally engage the rollers 36 of the strand 32 of the chain 28. The toothed gear 62 includes a shaft 64, which allows the relative rotation of the composite gear 12 and the toothed gear 60 with respect to each other.

Referring now to FIGS. 5–8, another embodiment of the invention is shown. This embodiment is similar to the previous embodiment, except for the technique of restraining the chain from rotation. In this embodiment, a gear set 110 is provided which includes a composite gear 112, which composite gear includes a circular disk member 114 which has a shaft 116 extending therefrom. A pair of slots 118, 120 are provided around the circumference of the disk which have link plate supporting surfaces 122, 124 formed as a part thereof. A central portion 126 separates the slots 118, 120. A roller chain 128 having a pair of strands 130, 132 is provided, which strands have respectively rollers 134 and 136 mounted respectively for rotation on pins 138 and 140, respectively. The strand 130 has opposite link plates 142, 144, while strand 132 has opposite link plates 146, 148 to which the pins 138 and 140, respectively, extend. Thus, the roller chain 128 is a conventional two-strand roller chain in which the rollers 134, 136 are free to rotate on pins 138, 140.

The chain 128 is reeved around the disk 114, with the link plates 142 engaging link plate support surface 122, and link plates 144, 146 engaging link plate support surface 124. As in the previous embodiment, the disk 114 is configured so that the central portion 126 is spaced from the rollers 134 so that the rollers 134 can freely rotate with the link plates 142, 144, 146 supporting the chain 148 on the link plate support surfaces 122, 124. The composite gear 112 as described so far is substantially similar to the construction of the composite gear 12 of the previous embodiment.

In order to prevent slippage of the chain and to retain it in place circumferentially on the disk, three retainer pins 149 are provided which are circumferentially spaced. The retainer pins 149 have shafts 150 which extend into holes 151 bored in the central portion 126 of the disk 114. The retainer pins also each include a tapered head or end portion 155 which fits betweens a pair of rollers 134 on strand 130. Since the roller chain 128 is maintained in place by the pins 128, 130 around the periphery of the disk 114, the retainer pins 149 will be maintained in the holes 150 without the need of threading or other affixing thereto.

To complete the construction of the gear set 110, a toothed gear 160 is provided which has teeth 162 engaging the rollers 136 of strand 132 internally in a manner similar to that of the previous embodiment. The toothed gear 160 is also provided with a shaft 164 which allows rotation of the toothed gear 160.

The gear sets shown herein can be used in many different gearing configurations. For example, they can be used in the configuration shown in U.S. Pat. No. 4,307,630, or they can be used in the configuration shown in U.S. Pat. No. 4,640, 154.

It should also be noted that in certain gearing configurations, triple-strand chains may be required so that the composite gear can support two rotating gears. This can be done with gear sets according to the present invention where the composite gear is formed according to the teachings of either FIGS. 1–4 or FIGS. 5–8. Certain of the embodiments in U.S. Pat. Nos. 5,640,154 and 4,307,630 show such triple-strand chain configurations. Moreover, it is to be understood that these two patents are only illustrative of many different gearing configurations and can be formed utilizing the composite gears of the present invention, and these illustrations are not intended to limit the gear configurations.

Referring now to FIGS. 9–10, yet another embodiment of the present invention is shown which is especially suitable for external gearing and requires only single-strand roller chain for providing the gear set. The configuration of the composite gear is quite similar to that of the embodiment shown in FIGS. 1–4. In this embodiment, a gear set 210 is provided which includes a composite gear 212 which includes a circular disk 214 which has a shaft 216 connected thereto for rotation thereof. A pair of slots 218, 220 are formed in the outer peripheral surface of the disk 214. These slots are similar to slots 18, 20 of the embodiment of FIGS. 1–4, except that the slot 220 is narrower than the slot 20 since it need support only one set of side link plates rather than two as will be described presently. The slots 218, 220 have link plate supporting surfaces 222 and 224 separated by a central portion 226.

A single strand of roller chain 228 is reeved around the disk 214. The roller chain has rollers 234 which are rotatably mounted on pins 238 which extend between opposite side link plates 242, 244. The link plates 242, 244 engage against the link plate supporting surfaces 222 and 224, respectively, and the rollers 234 are supported in spaced relationship from the central portion 226 and thus are freely rotatable on the pins 238.

Three retainer plates 252 similar to those shown in the embodiments of FIGS. 1–4 are provided which resides in a milled grooves 254 formed in the disk 214. The end of the retainer plates 252 have tapered ends 255 of the type shown in embodiments of FIGS. 1–4. Set screws 256 engage threaded bores 258 to retain the retainer plates 252 in position. Thus, the composite gear 212 is formed virtually the same as the composite gear of FIGS. 1–4, with the exception that only a single strand of link chain 228 is used, rather than multiple-strand chains as used in FIGS. 1–4.

A toothed gear 270 is provided which has teeth 272 which mesh with rollers 234 such that the composite gear 212 and the toothed gear 270 are in driving or meshed relationship. The toothed gear 270 is provided with a shaft 274 upon which the toothed gear rotates. Again, as in the previous embodiments, this particular gear set can be used in many different configurations where external gearing is required. It can be straight power transmission or can be in an orbital or cyclical configuration, or any other types of conventional configurations.

While several embodiments of this invention have been shown and described, various adaptations and modifications can be made without departing from the scope of the invention as defined in the appended claims.

What is claimed is:

1. A component gear member comprising:
   a) a generally circular disk, said disk having first and second circumferentially-extending spaced link plate receiving grooves, each having link plate supporting surfaces separated by a central section;
   b) a strand of roller chain having a plurality of rollers rotatably mounted on support pins between a plurality of first and second side plates;
   c) said chain being reeved around said disk with said first and second side plates being supported by said link plate supporting surfaces;
   d) said central section of said disk and said chain are configured to mount said rollers in spaced relationship with respect to said central section; and
   e) at least one retaining device connected between said chain and said disk to restrain circumferential movement of said chain with respect to said disk;
   f) whereby said chain is supported on said side links with said rollers being free of bearing load on said disk to define a gear member.

2. A gear member according to claim 1, wherein each of said retaining devices are interposed between said central section of said disk and said rollers of said chain.

3. A gear member according to claim 2, wherein each retaining member is a projection extending radially from said central section between a pair of adjacent rollers.

4. A gear member according to claim 2, wherein there are a plurality of retaining devices circumferentially spaced with respect to each other.

5. A gear member according to claim 1, wherein each of said retaining members is interposed between said disk and a pair of said side plates of said chain.

6. A gear member according to claim 5, wherein each of said retaining devices is a plate detachably secured to said disk.

7. A composite gear member according to claim 5, wherein there are a plurality of circumferentially-spaced retaining devices.

8. A gear set comprising:
   a) a composite gear member having
   i) a generally circular disk, said disk having first and second circumferentially-extending spaced link plate receiving grooves, each having link plate supporting surfaces separated by a central section;
   ii) a strand of roller chain having a plurality of rollers rotatably mounted on support pins between a plurality of first and second side plates;
   iii) said chain being reeved around
   said disk with said first and second side plates
   being supported by said link plate supporting
   surfaces;
   iv) said central section of said disk and said chain are configured to mount said rollers in spaced relationship with respect to said central section;
   v) at least one retaining device connected between said chain and said disk to restrain circumferential movement of said chain with respect to said disk;
   vi) whereby said chain is supported on said side links with said rollers being free of bearing load on said disk to define a gear member, and
   b) a toothed gear member having gear teeth drivingly engaged with the rollers of said first gear member.

9. A gear set according to claim 8, wherein said toothed gear engages said reeved strand externally thereof.

10. A gear set comprising:
    a) a composite gear member having
    i) a generally circular disk, said disk having first and second circumferentially extending spaced link plate receiving grooves, each having link plate supporting surfaces separated by a central section;
    ii) a roller chain having first and second adjacent strands, each strand having a plurality of rollers rotatably mounted on support pins between a plurality of first and second side plates;
    iii) the first strand of said chain being reeved around said disk with said first and second side plates of said strand being supported by said link plate supporting surfaces;
    iv) and wherein said central section of said disk and said chain are configured to mount said rollers of said first strand in spaced relationship with respect to said central section;

v) at least one retaining device connected between said chain and said disk to restrain circumferential movement of said chain with respect to said disk;

vi) whereby said chain is supported on said side links with said rollers being free of bearing load on said disk to define a gear member, b) a toothed gear member having gear teeth drivingly engaged with the rollers of the second strand of said chain.

11. A gear set according to claim 10, wherein said toothed gear engages said second strand internally thereof.

* * * * *